(No Model.)
T. LINDSEY.
AIR BRAKE.
No. 561,596.                          Patented June 9, 1896.
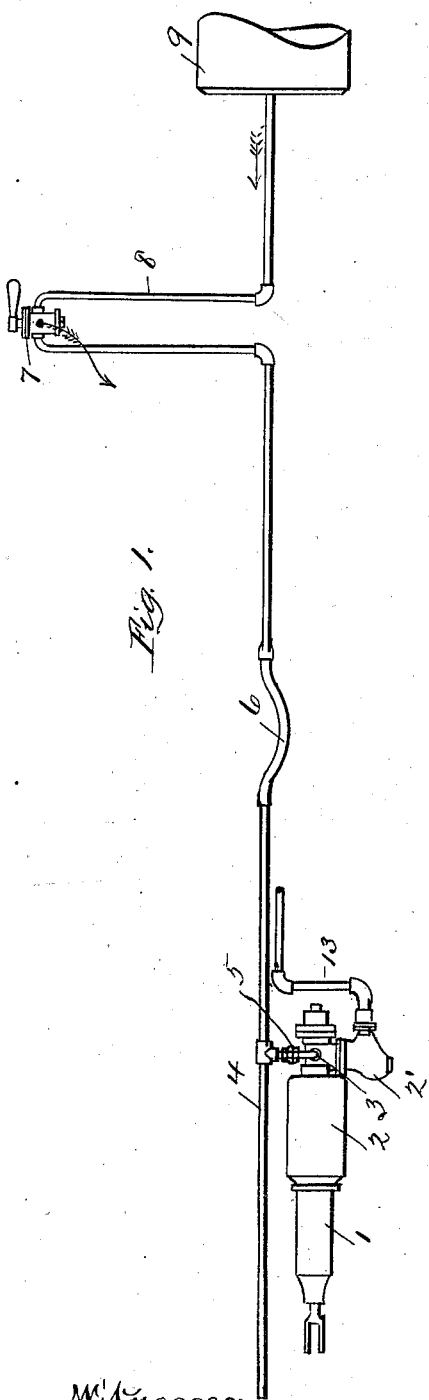
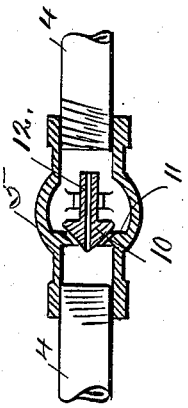
Witnesses:
J. E. Harrison
J. A. Herron
Inventor.
Thomas Lindsey
Per O. D. Levis
Atty

UNITED STATES PATENT OFFICE.

THOMAS LINDSEY, OF WILMERDING, PENNSYLVANIA.

AIR-BRAKE.

SPECIFICATION forming part of Letters Patent No. 561,596, dated June 9, 1896.

Application filed October 29, 1894. Serial No. 527,121. (No model.)

*To all whom it may concern:*

Be it known that I, THOMAS LINDSEY, a citizen of the United States, residing at Wilmerding, in the county of Allegheny and State of Pennsylvania, have invented certain new and useful Improvements in Air-Brakes; and I do hereby declare the following to be a full, clear, and exact description of the invention, such as will enable others skilled in the art to which it pertains to make and use the same, reference being had to the accompanying drawings, which form a part of this specification.

My invention relates to an improvement in air-brakes for railways; and it consists in certain details of construction and combination of parts, as will be fully described hereinafter.

In the accompanying drawings, Figure 1 is a side elevation of my improved air-brake, which is constructed and arranged in accordance with my invention. Fig. 2 is a side sectional elevation of the check-valve used in connection with my improved brake.

To put my invention into practice with the ordinary railway air-brake, such as are now in common use, consisting of the brake-cylinder 1 and its attached auxiliary reservoir 2, together with the triple valve 2' and the connecting-pipes 13, leading to the engineer's valve, (not shown,) I connect to the exhaust-port of the said triple valve 2' a pipe 3, having therein a valve 5. The valve 5 consists of a shell provided with an inner horizontal partition 11, formed with a valve-seat, and a valve 10, arranged in said shell and seating toward the exhaust in said seat. The valve 10 has a passage 12 extending centrally therethrough and through its stem for the direct passage of the air through the same on its way to the brake-cylinder, said valve opening only when exhausting. This pipe 3 is connected to a train-pipe 4, fitted with suitable flexible couplings 6 and leading to the main reservoir 9, located on the engine. This pipe 4 is provided with a branch 8 and three-way cock 7, by means of which the air in the cylinder 1 may be retained any desired length of time.

In operation the "straight air" or air under high pressure may be supplied to the brake-cylinder and the pressure maintained in the said cylinder any length of time. By setting the three-way cock 7 in one direction the air from the reservoir 9 will have a straight passage to the brake-cylinder through the exhaust-port, and the said cylinder will be kept constantly supplied with air under pressure from the reservoir 9, and by setting said triple cock in another direction the air of said cylinder may be exhausted.

Having thus described my invention, what I claim, and desire to secure by Letters Patent, is—

In an air-brake system, comprising the ordinary main reservoir, engineer's valve, and train-pipe, the combination, with the supplemental pipe connected with said main reservoir, a pipe connected with said supplemental pipe and the exhaust-chamber of the triple valve, a valve seated in said pipe between said supplemental pipe and exhaust-chamber, having a central air-passage therethrough, and a three-way cock located in said supplemental pipe, whereby main-reservoir air may be fed to the brake-cylinder, or the brake-cylinder air exhausted, substantially as set forth.

In testimony that I claim the foregoing I hereunto affix my signature this 14th day of May, A. D. 1894.

THOMAS LINDSEY. [L. S.]

In presence of—
 JAS. J. MCAFEE,
 M. E. HARRISON.